E. SCHNEIDER.
TRACTION DEVICE.
APPLICATION FILED DEC. 28, 1915.

1,271,951.

Patented July 9, 1918.
5 SHEETS—SHEET 2.

E. SCHNEIDER.
TRACTION DEVICE.
APPLICATION FILED DEC. 28, 1915.

1,271,951.

Patented July 9, 1918.
5 SHEETS—SHEET 3.

E. SCHNEIDER.
TRACTION DEVICE.
APPLICATION FILED DEC. 28, 1915.

1,271,951.

Patented July 9, 1918.
5 SHEETS—SHEET 4.

E. SCHNEIDER.
TRACTION DEVICE.
APPLICATION FILED DEC. 28, 1915.
1,271,951.
Patented July 9, 1918.
5 SHEETS—SHEET 5.
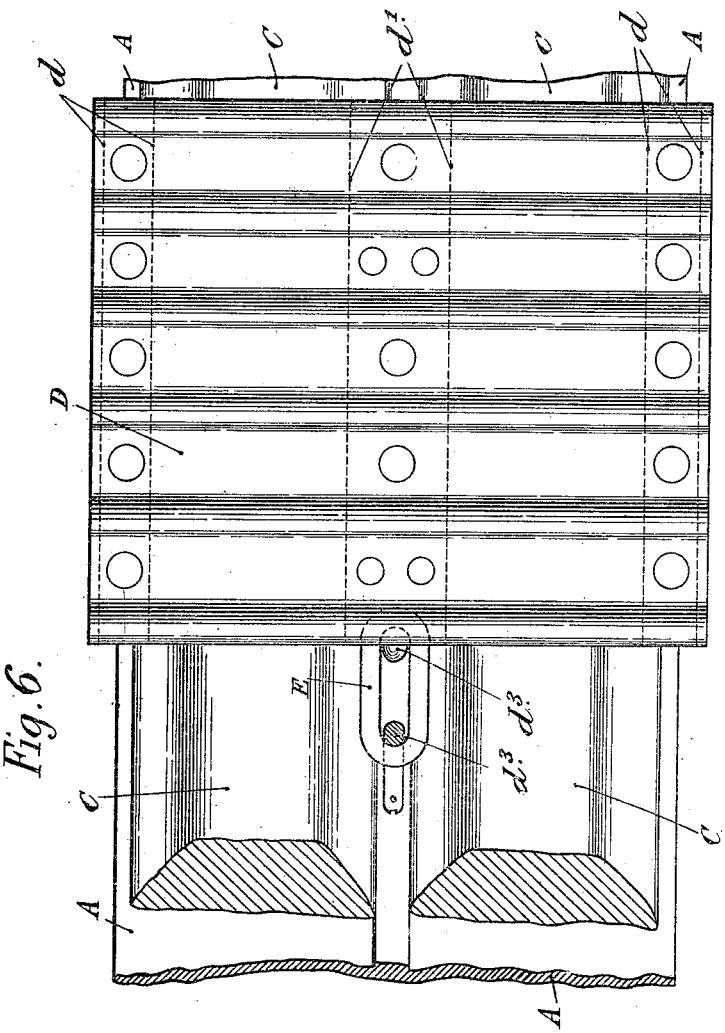

UNITED STATES PATENT OFFICE.

EUGÈNE SCHNEIDER, OF LE CREUZOT, FRANCE.

TRACTION DEVICE.

1,271,951.      Specification of Letters Patent.      Patented July 9, 1918.

Application filed December 28, 1915. Serial No. 69,101.

*To all whom it may concern:*

Be it known that I, EUGÈNE SCHNEIDER, a citizen of the Republic of France, residing at Le Creuzot, France, have invented a new and useful Traction Device, which is fully set forth in the following specification.

This invention has for its object to provide an improved traction device particularly adapted for vehicle wheels fitted with twin tires, and comprises a series of rigid shoes connected to one another by chain lengths.

According to the present invention at least some of these chain lengths comprise, preferably in the middle of their length, an attaching link, that is to say, a link so shaped and arranged as to be adapted to serve as a device for attaching the traction device to the rim of the wheel. For the purpose of providing a practical attachment of these attaching links at suitable points, the said chain lengths are arranged in the central plane of the wheel, that is to say, between the two tires, and these two tires instead of being joined together as in ordinary twin tired wheels, are situated a suitable distance apart to allow of accommodating the attaching parts.

Two practical embodiments of this invention are illustrated by way of example in the accompanying drawings in which:

Fig. 1 is a side view, partly in section, of a portion of a twin tired wheel provided with the improved traction device, one of the tires being omitted;

Fig. 2 is a section showing the attaching link in end elevation;

Fig. 3 is a fragmentary view showing a shoe in plan;

Figs. 4, 5 and 6 are respectively corresponding views of another embodiment of the invention.

Fig. 4 is a side view, partly in section, one of the tires being omitted;

Fig. 5 is a section through the rim, the tires and a shoe; and

Fig. 6 is a fragmentary view showing a shoe in plan.

Referring generally to the drawings, A is the rim, and B, B, the spokes, of a wheel provided with twin elastic tires C, C. The traction device, which is preferably endless is composed in the well known manner of a series of shoes D connected to one another by chain lengths.

According to the present invention all or some of these chain lengths comprise, preferably in the middle of the chain length, together with the usual links E, an attaching link F constructed to serve for attaching the chain length to the wheel rim A. The entire chain lengths E—F—E are arranged in the central plane of the wheel, and their attachment to the wheel rim by means of the attaching link F is rendered possible by means of the space $c$ provided for this purpose between the two tires C.

Figure 1:
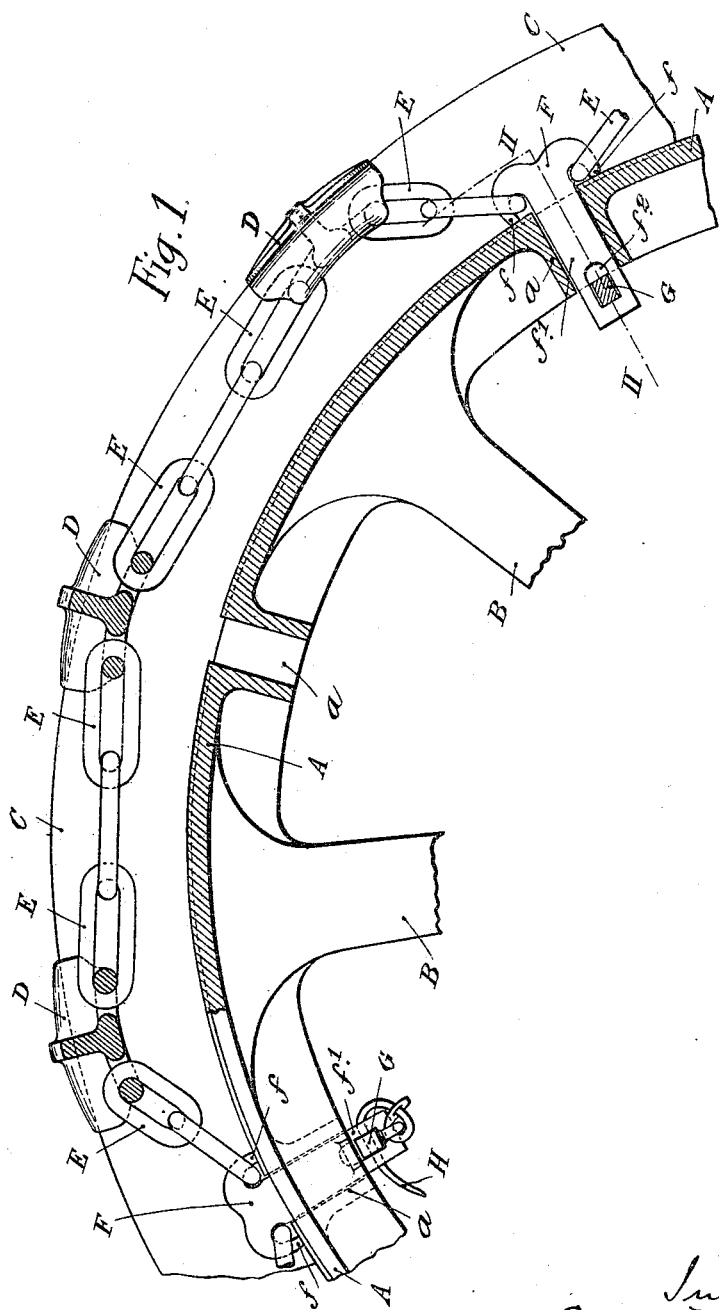
Figures 1, 2 and 3 illustrate one embodiment. In these figures:—
Figure 2:
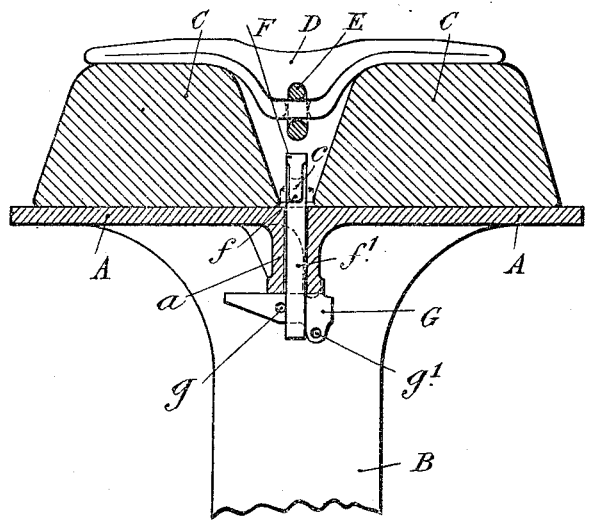
Figure 3:
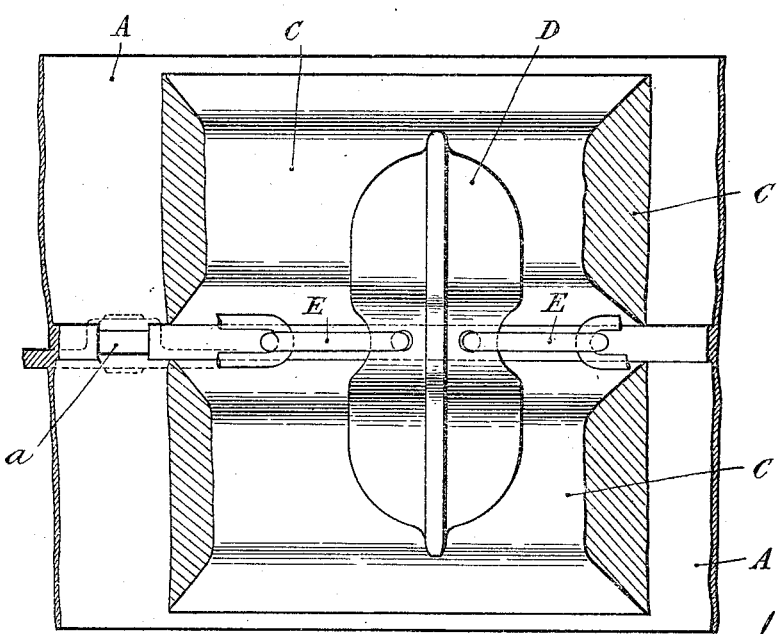

In the embodiment shown in Figs. 1, 2 and 3, the attaching link F has a head formed with two hooks $f$ with which engage the adjacent links E of the chain length, and a shank $f^1$ of a rectangular section which engages in a socket $a$ of corresponding section provided in the wheel rim in alinement with the space $c$ left between the two tires C. The attaching link thus constructed and engaged in its socket $a$, is maintained in place by any suitable means, such for instance, as shown in Figs. 1 and 2, by a wedge key G driven through a slot $f^2$ formed in the shank $f^1$ near the end thereof, bearing against the end wall of said slot and against the free edge of the socket $a$. A strap or cord H (Fig. 1) is inserted through holes $g$, $g^1$ in the key for the purpose of holding the latter in place.

The number of the shoes and the number of the chain lengths of which the traction device is composed, may be varied at will. Also it is not necessary that every chain length located between successive shoes shall comprise an attaching link for attaching the chain length to the wheel rim.

Figure 4:
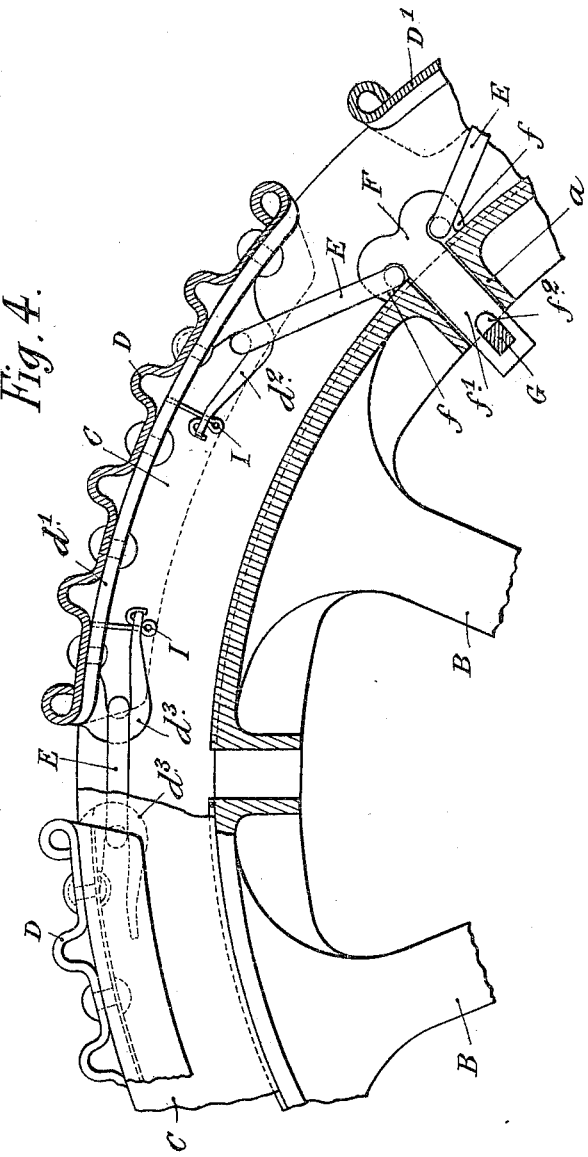
Figure 5:
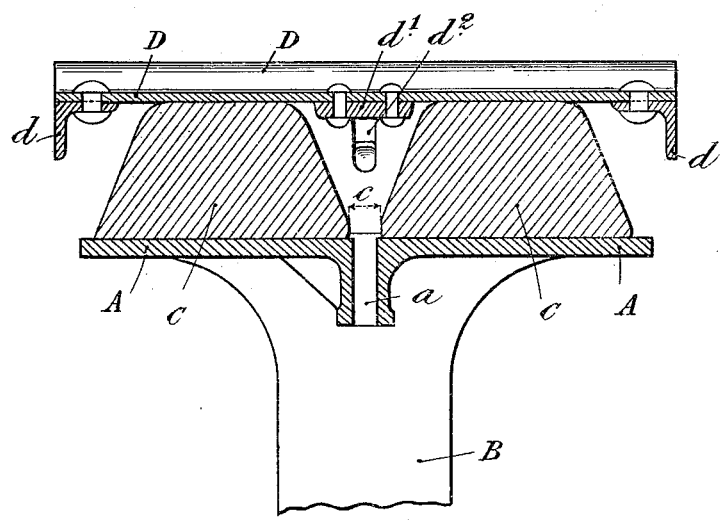

The embodiment illustrated in Figs. 4, 5 and 6 shows a traction device composed of successive groups of two shoes D—D, $D^1$—$D^1$, &c. The two shoes of the group D—D are connected together by a chain section or link E which does not comprise an attaching link, but each of said shoes is connected to the next shoe of the adjacent group by a chain length E—F—E which comprises an attaching link F.

In this embodiment the shoes D are made of corrugated sheet metal. The corrugations facilitate the adhesion as well as increase the transverse rigidity of the shoes. Longitudinal rigidity is assured by means of two angles $d$ riveted to the edges of each shoe, and an intermediate stiffening strap $d^1$ located between the two tires C. This stiffening strap may be provided with hooks $d^2$ and $d^3$ for engaging the links of the chain lengths that connect the shoes together.

I are pins provided at the ends of the hooks $d^2$, $d^3$; they serve to prevent the links E from falling out during the removal of the traction device.

The attaching links employed with this construction are the same as those shown in the embodiment of the invention illustrated in Figs. 1, 2 and 3.

What I claim is:

1. In a traction device, a plurality of shoes, means connecting the shoes in pairs, means connecting the respective pairs of shoes, each of said last-named connecting means including a unitary, double-hooked member engaging adjacent sections of the connecting means, and means for attaching said members to the wheel-rim.

2. In a traction device, a plurality of shoes, single links connecting the shoes in pairs, linked connections between the respective pairs of shoes, and means between the ends of each of said last-named connections for attaching the traction device to a wheel-rim.

3. In a traction device, a plurality of shoes, single links connecting said shoes in pairs, linked connections between the respective pairs of shoes, each of said last-named connections including a unitary, double-hooked member engaging adjacent links of the connection, and means for attaching said members to the wheel-rim.

4. In combination with a vehicle wheel provided with twin tires, a traction device comprising a plurality of shoes bridging the space between said tires, means between the tires for connecting the respective shoes, a plurality of said connecting means each including between the ends thereof a unitary, double-hooked member engaging adjacent sections of the connecting means, and means for attaching said members to the wheel-rim between said tires.

5. In combination with a vehicle wheel provided with twin tires, a traction device comprising a plurality of shoes bridging the space between said tires, means between the tires for connecting the shoes in pairs, means between the tires for connecting the respective pairs of shoes, and means between the ends of each of said last-named connecting means for attaching said traction device to the wheel-rim between said tires.

6. In combination with a vehicle wheel provided with twin tires, a traction device comprising a plurality of shoes bridging the space between said tires, single links between the tires for connecting said shoes in pairs, and linked connections between the tires for connecting the respective pairs of shoes, a member of each of said last-named connections being provided with means for attaching the traction device to the wheel rim between said tires.

7. In a traction device, a plurality of shoes, means connecting the respective shoes, means in the length of certain of said connecting means for attaching said traction device to a wheel-rim, said means comprising a member having a double-hooked outer end for engaging adjacent sections of said connecting means, and a device for securing said member to the wheel-rim, said device comprising a wedge key passing through an opening in said member and engaging the wheel-rim.

8. In a traction device, a plurality of shoes, means connecting the respective shoes, means in the length of certain of said connecting means for attaching said traction device to a wheel-rim, said means comprising a member having a double-hooked outer end for engaging adjacent sections of said connecting means, and a device for securing said member to the wheel-rim, said device comprising a wedge key passing through an opening in said member and engaging the wheel-rim and means for holding said key in place.

In testimony whereof I have signed this specification in the presence of two subscribing witnesses.

EUGÈNE SCHNEIDER.

Witnesses:
  CHAS. P. PRESSLY,
  G. F. WADLEY.

Copies of this patent may be obtained for five cents each, by addressing the "Commissioner of Patents, Washington, D. C."